Dec. 21, 1954  R. A. GAISER  2,697,675
LAMINATED SAFETY GLASS STRUCTURES AND
METHOD OF MAKING THE SAME
Filed March 21, 1951  2 Sheets-Sheet 1

Inventor
Romey A. Gaiser
By Nobbe & Swope
Attorneys

United States Patent Office 2,697,675
Patented Dec. 21, 1954

2,697,675

LAMINATED SAFETY GLASS STRUCTURES AND METHOD OF MAKING THE SAME

Romey A. Gaiser, Toledo, Ohio, assignor to Libbey-Owens-Ford Glass Company, Toledo, Ohio, a corporation of Ohio Application March 21, 1951, Serial No. 216,767

17 Claims. (Cl. 154—2.71)

The present invention relates to laminated safety glass, and is a continuation-in-part of my copending application Serial No. 49,932, filed September 18, 1948; now Patent No. 2,584,859.

Laminated safety glass, per se, is well known in the art and, generally speaking, comprises two or more sheets of glass and one or more interlayers of tough, flexible thermoplastic material all bonded together under the action of heat and pressure to produce a unitary composite structure.

Electrically conducting laminated safety glass is a relatively new development and is similar in construction to ordinary laminated safety glass except that one of the glass sheets has an electrically conducting coating on an inner surface thereof. This electrically conducting coating may, for example, be a clear, transparent film of tin oxide as disclosed in the patent to Harold A. McMaster, No. 2,429,420 dated October 21, 1947, and in order to conduct electricity to and from the coating, electrodes are provided, usually along two opposite marginal portions of the coated glass sheet, and laminated into the unit.

To date such units have found their principal utility as de-icing windows or windshields in automobiles and aircraft, the electrically conducting coating being supplied with electrical energy sufficient to heat the unit to a temperature at which ice or frost will be removed from, or its formation will be prevented on, the surface of the exposed glass sheet.

Now ordinary laminated glass, as produced by present day techniques, is a very stable article even under severe temperature conditions. However, electrically conducting laminated glass presents additional problems due to the fact that, in use, the temperatures at the various surfaces of the unit may be, and usually are, widely divergent. For example, when employed as a window or windshield in automobiles traveling in cold climates, or in airplanes at high altitudes, the glass and plastic surfaces adjoining the electrically conducting film will be exposed to quite high temperatures, the surface of the unit facing the interior of the vehicle will be exposed to normal room temperatures, and the outside surface of the unit will be exposed to temperatures which may be far below zero.

Because of the difference in coefficient of expansion and contraction between the glass and the plastic interlayer, such temperature differentials have resulted in repeated electrode failure within the unit, usually accompanied by edge separation between the glass and plastic laminations.

However, I have discovered that by providing a suitable separator between the plastic interlayer and the glass sheet at the marginal portion of the unit, and/or in the area of the electrode on the glass, the possibility of electrode failure in such units can be greatly minimized if not entirely eliminated.

It is therefore an aim of this invention to provide a special type of electrically conducting laminated safety glass, and a method of making such a unit, which will eliminate electrode failure in the unit even under the most extreme temperature conditions.

Another object is the provision of a laminated safety glass unit and method of making the same which will eliminate edge separation under such conditions.

Another object is to eliminate injury to a laminated safety glass unit due to expansion and contraction of the plastic interlayer by the provision of a separating layer between contiguous glass and plastic surfaces along marginal portions of the unit.

Another object is to provide such a separating layer which has very slight or no adhesion to the surfaces with which it is in contact.

Another object is the provision of a separating layer which is elastic in nature and remains so under severe temperature conditions.

Still another object is to provide a separating layer of the above character which also extends over the edge of at least one of the laminations.

Other objects and advantages of the invention will become more apparent during the course of the following description, when taken in connection with the accompanying drawings.

In the drawings, wherein like numerals are employed to designate like parts throughout the same:

Figure 1:
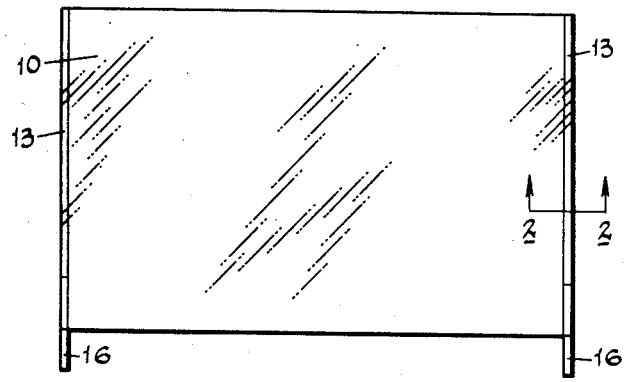
Fig. 1 is a front elevation of an electrically conducting laminated safety glass unit produced in accordance with the invention.
Figure 2:
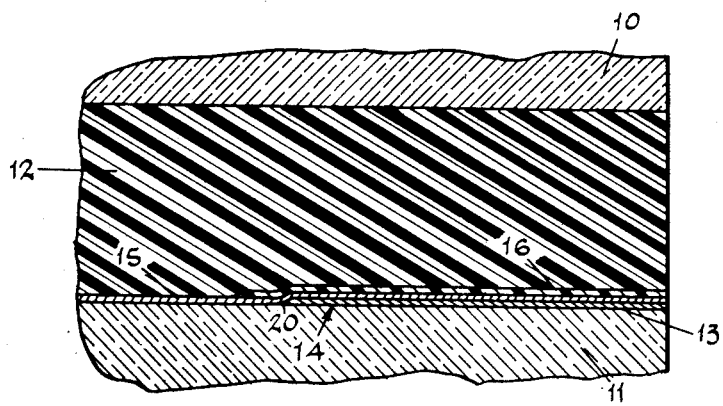
Fig. 2 is a fragmentary sectional view, on a greatly enlarged scale, taken substantially on the line 2—2 in Fig. 1.

Referring now more particularly to the drawings, the unit shown in Figs. 1 and 2 is made up of two sheets of glass 10 and 11, which may be ordinary plate or sheet glass of any desired composition, and one or the other or both of which may be tempered or semitempered, and an interposed layer 12 of a tough flexible thermoplastic material, all bonded together under heat and pressure to provide a composite unitary structure.

In order to render the unit electrically conducting, the plate 11, prior to laminating, is preferably provided with suitable electrodes 13 along two opposite marginal portions of the inner surface 14 thereof, and with an electrically conducting film 15 on this same surface.

A number of different materials may be used for the electrodes 13 and they may be applied to the glass in any convenient manner. For example, electrodes of sprayed copper, sprayed copper alloys, copper foil, silver and platinum fluxes and combinations of these materials have all been used satisfactorily.

To date, the familiar silver bus bar material has been found to be as satisfactory as any, with the possible exception of platinum flux electrodes. The principal advantage of the platinum electrode is that leads can be soldered directly to it, whereas with the silver type bus bars or electrodes, the silver must be electroplated with copper before soldering can be accomplished. The disadvantage of platinum bus bars lies in their high cost.

According to one preferred method of applying the electrodes 13 and the electrically conducting film 15 to the glass sheet 11, the marginal portions of the sheet along its two short sides are first sprayed with an electrically conducting silver flux and then heated to fuse the flux onto the glass. The electrodes or bus bars thus formed may then be electroplated with copper to permit the soldering of suitable leads 16 thereto.

With the electrodes in place, the glass is then ready to be filmed and this can be done by first heating the sheet to approximately the softening point of the glass and then spraying the surface 14 with a solution of stannic tetrachloride to deposit a clear transparent electrically conducting layer of tin oxide 15 on the glass and in contact with the electrodes. If desired, the heating of the glass preparatory to filming can also be utilized to fuse the silver flux to the glass, thus eliminating one heating step.

The filmed sheet 11 can then be incorporated into an integral composite unit by assembling it together with a second sheet 10 and an interlayer sheet 12 into a glass-plastic sandwich, with the coated surface of the sheet 11 inside, and then laminating the several layers of the sandwich together in accordance with any of the well known laminating procedures.

When this has been done an electrically conducting laminated glass unit, which is stable and entirely satisfactory when tested in the laboratory under ambient temperature conditions, is obtained.

However, under low temperature testing, or when used in vehicles in climates or under conditions where extremely low temperatures are encountered, such units exhibit too great a percentage of electrode failures. These failures, in the greatest percentage of cases are in the form of arcing along one or the other of the electrodes when the current is applied. Such arcing, of course, results in hot areas which place the glass in severe thermal shock often resulting in glass failure, and making the units undesirable commercially.

A great deal of work has been done in attempting to overcome this difficulty by employing different types of electrodes and by modifying, treating, and redesigning the known types of electrodes. But it has been my opinion that this electrode failure was not due to defects in the electrode itself but instead that it was due, primarily, to relative movement of the laminations resulting from excessive temperature differentials within the unit and the wide difference in expansion and contraction coefficients of the glass and plastic of the laminations. And this opinion has been substantiated by subsequent tests.

Thus, it was found that some of the tested units in failure in cold room testing at temperatures down to −50° F. showed large areas where glass had parted from glass. In other words, the plastic to filmed glass bond and the film to glass bond showed adhesive forces greater than the cohesive forces in the glass itself.

Now the coefficient of linear expansion in a longitudinal direction of plastic sheeting of the type used in commercial laminated safety glass is $20.3 \times 10^{-5}/°F.$ from −58° to +77° F.; and it is $38.9 \times 10^{-5}/°F.$ in the same direction between +77° F. and +122° F. In a transverse direction, the coefficient of linear expansion per ° F. is $15.7 \times 10^{-5}$ between −58° F. and +77° F. and $22.2 \times 10^{-5}$ between +77° F. and +122° F. On the other hand, the coefficient of linear expansion of the assignee company's automotive plate or color clear glass, used in windshields, is approximately $50 \times 10^{-7}/°F.$ in the above temperature ranges. Or, simply expressed, the linear expansion of the plastic is between 30 and 80 times greater than that of the glass. Consequently, a structure composed of these two well-bonded materials such widely varying coefficients of linear expansion is comparable to bi-metallic thermostat construction.

Moreover, in a unit of this character, the film 15 which carries all of the current causes the surface 14 of the glass sheet 11 to become hot while the opposite surface of the same sheet, and which is preferably exposed to the outside, remains much cooler. Deflection measurements on unlaminated electrically conducting glass under these conditions show that such temperature differentials between the opposite surfaces of the glass sheet causes a bending of the glass, with the filmed surface being on the convex side of the bend.

Of course, the filmed sheet has this same tendency to bend when in a laminated unit, however at the same time, the surface of the plastic interlayer 12 that is adjacent the film becomes hot while the other side of the plastic interlayer remains cold, and this causes a bending of the plastic layer with the convex side being adjacent to the film 15. Because of the tight bond between the filmed glass and the plastic, the tendency of the glass sheet to bend in one direction is overcome and it is actually caused to bend in the opposite direction.

In other words, when such units are used in low temperatures, a flexing of the unit takes place which has a strong tendency to cause separation of the laminations around the periphery of the unit. Especially, since the edge of the glass where the flexing stresses are found in greatest concentration are also the points of greatest weakness. Consequently, due to the excellent filmed glass-plastic bond, separation in the glass itself takes place in these areas.

In the same way, the bond between the silver flux or the filmed silver flux of the bus bar 13 and the plastic interlayer 12 has proved under test to be approximately the same as that between the plastic and the glass, and, since the linear expansion coefficient of the bus bar is comparatively close to that of the glass, the enormous stresses set up by the expansion and contraction of the plastic and filmed glass will obviously cause electrode failure. Particularly, since a very slight movement of the electrode with respect to the base glass will result in an electrode to film interface separation and cause unavoidable arcing and possible glass failure.

This confirmed my opinion that electrode failure in these units really involves two distinct problems. First, the problem of the plastic expanding over the electrode area and causing a separation of the film at the electrode-film interface (indicated at 20); and, second, the problem of glass separation at the edges of the unit due to unequal coefficient of expansion plus flexing of the unit due to unequal heating.

According to the present invention, I overcome these difficulties and avoid electrode failure in electrically conducting laminated safety glass units by placing a separator between the electrode area and the glass. In some cases, the separator may extend down over the glass edge, and in another form of the invention I apply the separator to the edges of both sheets of glass and extend it inwardly for a short distance to cover the inner marginal areas of both of the glass sheets.

To illustrate one phase of the invention, and which is best shown in Fig. 2, after the glass sheet 11 with the electrodes 13 thereon has been filmed, and before it is laminated, I apply over the area of the electrode and preferably for a short distance inwardly beyond the inside edge thereof, a separator which, in this case, is a layer of parting material 16. That is, a material which exhibits a poor bond, or practically no bond at all between itself and the bus bar material, and also little or no bond between itself and the plastic interlayer 12. There are a great many materials that are satisfactory for this purpose. For example, I have tried, among others, cellulose acetate, and untreated cellulose acetate, dissolved in various solutions, also silicone oils, stearic acid, vinyl chloride resin solutions, etc. It may also be desirable to extend the layer of parting material downwardly over at least a part of the adjacent edge of the glass as shown in Fig. 3.

After application of the parting material 16, the glass sheet 11 may be laminated with any desired number of alternate layers of glass and plastic to provide the type of laminated unit required.

The function of the separator in this case is to permit the plastic interlayer to expand and contract freely over the area of the electrode without affecting the electrode in any way and without its having any tendency to move the electrode within the unit or to pull it from the glass or out of contact with the film 15. A large number of units fabricated in this manner have been tested under extremely severe conditions without a single electrode failure.

Figure 3:
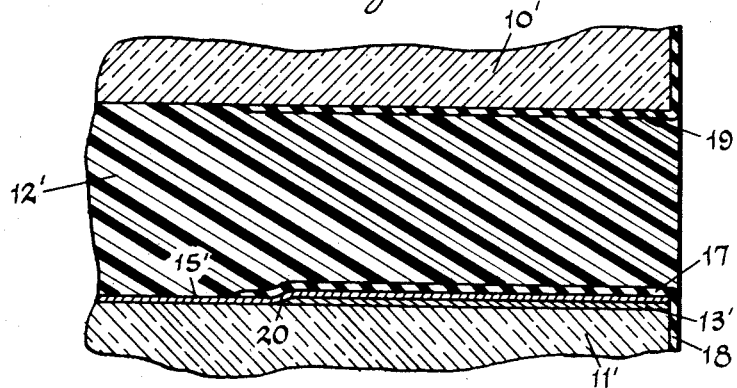
Fig. 3 is a view similar to Fig. 2, but showing a modified form of separating layer.

An alternate form of the invention is illustrated in Fig. 3 in which a different type of separator 17 is applied to the glass sheet 11′ after it has been provided with an electrode 13′ and an electrically conducting coating 15′. The separator 17 may be applied in a similar manner and to the same electrode area as the parting material 16 in Fig. 2.

However, in this case, the separator is a well bonded elastic material, or an adhesive having low temperature elasticity, rather than a parting material. This arrangement too, effectively prevents electrode failure, although in a somewhat different manner. Thus, if a suitably permanent or thermostable elastic separator material, which will bond to the glass and to the plastic and will remain elastic at low temperatures, is placed over the electrode area at the edges of the lamination, the strength of the unit will be maintained and glass separation avoided even during bowing of the laminations due to wide temperature differentials.

A number of materials have been found to be suitable for this purpose and these include the synthetic rubber cements and the Thiokols.

As noted above, the layer of elastic material 17 may be placed in the same position and over the same area as the layer of parting material 16 in Fig. 2. However, I have found that it is desirable at least in some cases to extend the elastic material downwardly over the edge of the glass sheet as shown.

It is desirable to extend the separating material downwardly over the edge of the glass sheet in this way because of the possibility of getting plastic on the glass edge during the laminating procedure. If this happens when there is no separating material on the edge the plastic will be tightly bonded to the glass edge. Consequently, when the unit cools the difference in expansion and contraction between the glass and tightly bonded plastic will cause glass to part from glass thus tearing or separating the film on the glass surface.

In addition, greater protection from edge separation can be had by placing a similar layer of elastic material 19 at the margins of the unit, between the plastic 12' and the glass sheet 10'. Likewise, the parting material 16 of Fig. 2 may be extended over the edge of the glass sheet 11, and a layer of parting or elastic material, located as shown at 19 in Fig. 3, may also be employed in the unit of Fig. 2.

The function of the separator material of the invention, when associated with the electrode and filmed surface of the glass, in preventing edge separation, and tearing of the glass, due to the difference in the coefficient of expansion and contraction between the adjoining layers of glass and plastic, has been explained in detail above.

However, as shown at 19 in Fig. 3, the separator material will also function for this purpose when not directly associated with the electrode or the filmed surface of the glass. As a matter of fact, the invention has also proven valuable in preventing glass fracture in ordinary laminated glass which is not electrically conducting at all, as well as in various locations in electrically conducting laminated safety glass that are removed from the filmed glass surface and/or electrodes.

For example, it has been found to be an extremely important feature in so-called extended plastic types of laminated safety glass. That is, laminated safety glass in which the plastic interlayer is of greater area than at least one of the glass sheets so that the interlayer extends outwardly beyond the glass at the margin of the unit to provide a flexible or compressible attaching or mounting flange.

Figure 4:
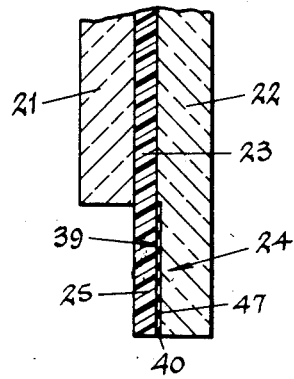
Fig. 4 is a fragmentary, vertical, sectional view of a laminated safety glass unit produced in accordance with the invention, and having an extended attaching flange.

Representative forms of extended plastic, laminated safety glass units have been illustrated in Figs. 4 to 7, of the drawings. Thus, there is shown in Fig. 4 a laminated safety glass unit made up of two sheets of glass 21 and 22 integrally bonded together in face to face relationship by an interlayer of a non-brittle thermoplastic material 23. In this particular construction one of the glass sheets 22 is of greater area than the other glass sheet 21 so that the former extends outwardly beyond the latter as at 24 to provide an attaching flange. The plastic interlayer 23 is also of greater area than the glass sheet 21 and, as shown here, of the same area as the glass sheet 22 and provides a compressible facing 25 for the extended flange portion 24.

Figure 5:
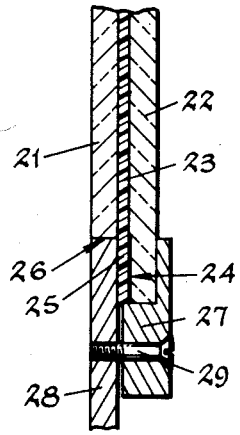
Fig. 5 is a fragmentary, vertical, sectional view showing the structure of Fig. 4 mounted as a glazing unit in an airplane.

The advantage of the extended flange in mounting the unit in an airplane is illustrated in Fig. 5. As there shown, the unit is used to glaze a window opening 26 in the "plane," and for this purpose the sheet 21 of the unit is located in the opening while the extended flange portion 24 is clamped between a clamping strip 27 and the skin 28 of the ship, by means of a machine screw 29. This permits the outer surface of the outboard light 21 of the unit to be mounted flush with the outer surface of the skin 28, or outer wall, of the ship.

Figure 6:
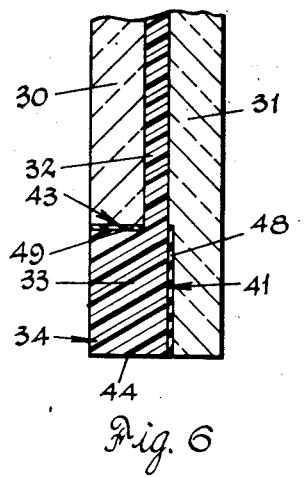
Fig. 6 is a fragmentary, vertical, sectional view of modified form of extended plastic unit produced in accordance with the invention.

The unit shown in Fig. 6 is similar to that illustrated in Figs. 4 and 5 in that it also comprises two sheets of glass 30 and 31 and an interposed layer of plastic 32, with the area of the glass sheet 31 and of the plastic interlayer 32 being of greater area than the glass sheet 31. However, in this case the extended portion 33 of the interlayer is enlarged to an extent sufficient to cover the edge of the glass sheet 31 to provide a marginal portion 34 that is of the same thickness as the body of the unit.

Figure 7:
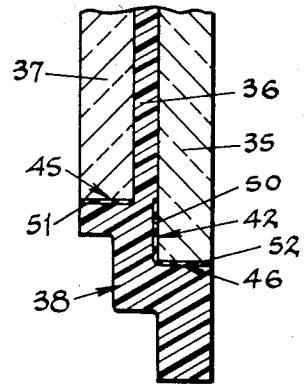
Fig. 7 is a similar view of still another form of extended plastic type, laminated safety glass, embodying the invention.

Similarly, in the unit shown in Fig. 7, the glass sheet 35 and the plastic interlayer 36 are both of greater area than the glass sheet 37. In this case, however, the plastic interlayer is of greater area than either of the glass sheets, and its extended portion 38 is both enlarged and of stepped construction, so that it covers the edge of both the glass sheet 37 and the glass sheet 35.

Now it has been found in actual use that laminated safety glass units of this general extended plastic type are particularly susceptible to glass fracture, especially in the areas of glass to plastic bond in which the plastic is unsupported by glass on one side.

To illustrate, in conventional units of the type shown in Figs. 4 and 5, and in which all facing surfaces of glass to plastic are integrally bonded together, it will be found, under extreme temperature conditions, that the difference in coefficient of expansion between the plastic and glass will have a tendency to create movement of the plastic relative to the glass at the glass-plastic interface 39 and thereby result in the plastic tearing the glass along this interface and especially adjacent the outer corner 40. A similar situation will exist at the interface 41 in the unit of Fig. 6, and at the interface 42 in the unit of Fig. 7.

In addition, in the unit of Fig. 6, a further potential danger area will exist at the glass-plastic interface 43 since the surface 44 of the plastic opposite the edge of the glass sheet 30 is unsupported by, or unbonded to, glass.

This same condition will exist at the interface 45 in the unit of Fig. 7; and this unit will have a third potential danger area, for the same reason, at the interface 46.

According to the present invention, however, it has been found that the possibility of edge separation and glass fracture in these areas can be eliminated by separating the glass from the plastic in these areas or, differently expressed, by preventing, or modifying the extremely tight and permanent glass to plastic bond in the area.

Preferably this is done during assembly of the units, and prior to laminating the glass and plastic layers together into a unitary composite structure, by the application of a layer of parting material between the facing glass and plastic surfaces in the danger areas. For example, in the unit of Fig. 4 a layer of parting material 47 is applied, in the manner set forth above in connection with Figs. 1 to 3, between the glass and plastic in the extended flange portion 24.

In the case of the unit of Fig. 6, a similar layer of separating material 48 is applied between the facing marginal portions of the interlayer 32 and the glass sheet 31; and a second layer of parting material 49 is applied between the edge of the glass seet 30 and the upper inside surface of the enlarged portion 33 of the interlayer 32.

Similar layers of parting material 50 and 51 are applied between the margin of the larger glass sheet 35 and the facing extended portion of the plastic interlayer 36, and between the edge of the smaller glass sheet 37 and the facing surface of the extended portion 38 of the plastic interlayer 36, respectively. In addition, in this particular form of unit, the separator layer 50 is extended over the contiguous edge of the glass sheet 35 to provide, in effect, a third layer 52 of separator material between the edge of the glass sheet 35 and the facing surface of the extended portion 38 of the plastic interlayer 36.

As explained above, the separator material just referred to may be any material that will prevent the normally integral glass to plastic bond being set up in the selected areas during conventional laminating procedures, and which is chemically inert to both the glass and plastic to the extent that it will not injuriously affect either of them at the temperatures encountered during production and use of the unit.

For example, any of the parting materials already referred to may be used. When this is done the material may be non-adherent to either the glass or plastic; or, it may be adherent to one or the other, but not to both. In this case the parting-separator material acts primarily to prevent the plastic from adhering to the glass in the selected areas.

Alternately, the elastic parting materials referred to above can be used. These materials can be adhered to either one or to both the glass and plastic surfaces, but will be sufficiently elastic or extensible, at temperatures down to minus 70 degrees F., to accommodate relative movement between the facing glass and plastic surfaces. As another embodiment, the parting material may be adherent to both the glass and plastic surfaces, but so lightly so that it will creep along the surfaces as they expand or contract under temperature differentials.

It is to be understood that the forms of the invention herewith shown and described are to be taken as illus-

I claim:

1. In a laminated safety glass unit comprising a least one sheet of glass and a layer of non-brittle thermoplastic material integrally bonded thereto, a layer of separating material between said glass and said plastic covering a margin of said glass sheet and extending over onto a contiguous edge thereof to prevent the plastic from bonding to the glass in the area occupied by said separator material.

2. In a laminated safety glass unit comprising a least one sheet of glass and a layer of non-brittle thermoplastic material integrally bonded thereto, a layer of elastic separator material having less adherence to the glass than said thermoplastic material between said glass and said plastic over an area adjoining a marginal edge of the glass sheet only to permit relative movement between the glass and plastic surfaces over said area.

3. In a laminated safety glass unit comprising two sheets of glass and an interposed layer of non-brittle thermoplastic material all bonded together into a unitary composite structure and in which said plastic interlayer and one of said glass sheets extends outwardly beyond a margin of the other glass sheet, a layer of separating material between facing surfaces of said first mentioned glass sheet and said plastic in the area thereof lying outwardly beyond said second mentioned glass sheet and preventing the plastic from bonding directly to the glass over said area.

4. In a laminated safety glass unit comprising two sheets of glass and an interposed layer of non-brittle thermoplastic material all bonded together into a unitary composite structure and in which said plastic interlayer and one of said glass sheets extends outwardly beyond a margin of the other glass sheet, a layer of parting material that does not adhere to either of the glass or plastic between facing surfaces of said first mentioned glass sheet and said plastic in the area thereof lying outwardly beyond said second mentioned glass sheet and preventing the plastic from bonding to the glass over said area.

5. In a laminated safety glass unit comprising two sheets of glass and an interposed layer of non-brittle thermoplastic material all bonded together into a unitary composite structure and in which said plastic interlayer and one of said glass sheets extends outwardly beyond a margin of the other glass sheet, a layer of elastic material between facing surfaces of said first mentioned glass sheet and said plastic in the area thereof lying outwardly beyond said second mentioned glass sheet to permit relative movement between the glass and plastic surfaces over said area.

6. In a laminated safety glass unit comprising two sheets of glass and an interposed layer of non-brittle thermoplastic material all bonded together into a unitary composite structure and in which said plastic interlayer extends outwardly beyond the edge of at least one of the glass sheets and is provided with an enlarged portion lying over the edge of said sheet, a layer of separating material between the facing surfaces of said edge and the enlarged portion of said plastic layer and preventing the plastic from bonding directly to said glass at said facing surfaces.

7. A laminated safety glass unit comprising two sheets of glass and an interposed layer of non-brittle thermoplastic material which extends outwardly beyond the edge of at least one of the glass sheets and is provided with an enlarged portion lying over an edge of said sheet, all integrally bonded together into a unitary composite structure except the surface of the enlarged portion of the plastic layer facing the edge of said glass sheet which is not integrally bonded to the glass.

8. In a laminated safety glass unit comprising two sheets of glass and an interposed layer of non-brittle thermoplastic material all bonded together into a unitary composite structure and in which said plastic interlayer and one of said glass sheets extends outwardly beyond a margin of the other glass sheet, and the extended portion of said plastic layer is enlarged to cover an edge of said other glass sheet, a layer of separating material in the area between facing surfaces of said first mentioned glass sheet and said plastic layer in the area thereof lying outwardly beyond said other glass sheet, and a layer of separating material in the area between the facing surfaces of said enlarged portion of the plastic layer and the edge of said other glass sheet, to prevent the plastic from bonding directly to the glass over said areas.

9. In a laminated safety glass unit comprising two sheets of glass and an interposed layer of non-brittle thermoplastic material all bonded together into a unitary composite structure and in which said plastic interlayer and one of said glass sheets extends outwardly beyond a margin of the other glass sheet, and the extended portion of said plastic layer is enlarged to cover an edge of said other glass sheet, parting material that will not adhere to either the plastic or the glass in the area between the facing surfaces of said first mentioned glass sheet and said plastic layer in the area thereof lying outwardly beyond said other glass sheet, and parting material in the area between the facing surfaces of said enlarged portion of the plastic layer and said edge of said other glass sheet, preventing the plastic from bonding to the glass in said areas.

10. In a laminated safety glass unit comprising two sheets of glass and an interposed layer of non-brittle thermoplastic material all bonded together into a unitary composite structure and in which said plastic interlayer and one of said glass sheets extends outwardly beyond a margin of the other glass sheet, and the extended portion of said plastic layer is enlarged to cover an edge of said other glass sheet, a layer of elastic material in the area between the facing surfaces of said first mentioned glass sheet and said plastic layer in the area thereof lying outwardly beyond said other glass sheet, and a layer of elastic material in the area between the facing surfaces of said enlarged portion of the plastic layer and said edge of said other glass sheet, to permit relative movement between the glass and plastic surfaces in said areas.

11. In a laminated safety glass unit comprising two sheets of glass and an interposed layer of non-brittle thermoplastic material integrally bonded to the glass sheets and which extends outwardly beyond edges of the glass sheets and has portions thereof overlying said edges, separating material in the area between the facing surfaces of said portions of the plastic layer and said edges of the glass sheets to prevent the plastic from bonding directly to the glass in said areas.

12. A laminated safety glass unit comprising two sheets of glass and an interposed layer of non-brittle thermoplastic material integrally bonded to said glass sheets and extending outwardly beyond edges thereof and having portions overlying said edges in which the surfaces of said portions of the plastic layer facing the edges of the glass sheets are not integrally bonded to the glass.

13. In a laminated safety glass unit comprising two sheets of glass and an interposed layer of non-brittle thermoplastic material integrally bonded to said glass sheets and in which one of said glass sheets extends outwardly beyond the other and said interlayer extends outwardly beyond both glass sheets and has portions thereof overlying edges of said glass sheets, a layer of separating material between facing surfaces of said first mentioned glass sheet and said plastic in the area of the glass sheet lying outwardly beyond said other sheet, a layer of separating material in the area between facing surfaces of the portion of the interlayer overlying the edge of said first mentioned glass sheet and the said edge, and a layer of separating material in the area between the facing surfaces of the portion of said interlayer overlying the edge of said other glass sheet and said edge to prevent the plastic from bonding to the glass sheets in said area.

14. In a laminated safety glass unit comprising two sheets of glass and an interposed layer of non-brittle thermoplastic material integrally bonded to said glass sheets and in which one of said glass sheets extends outwardly beyond the other and said interlayer extends outwardly beyond both glass sheets and has portions thereof overlying edges of said glass sheets, parting material that does not adhere to either the glass or plastic between facing surfaces of said first mentioned glass sheet and said plastic where said facing surfaces lie outwardly of said other sheet, and parting material between facing surfaces of the portion of the interlayer overlying the edges of said glass sheets and said edges, preventing said plastic from bonding to said glass at these facing surfaces.

15. In a laminated safety glass unit comprising two sheets of glass and an interposed layer of non-brittle thermoplastic material integrally bonded to said glass sheets and in which one of said glass sheets extends outwardly beyond the other and said interlayer extends outwardly beyond both glass sheets and has portions thereof overlying edges of said glass sheets, a layer of elastic material between facing surfaces of said glass sheets and said plastic interlayer wherever said facing surfaces lie outwardly of one of said glass sheets to permit relative movement between the glass and plastic at said facing surfaces.

16. In a method of making laminated safety glass comprising two sheets of glass and an interposed layer of non-brittle thermoplastic material which extends outwardly beyond at least one of said glass sheets all bonded together under heat and pressure, the step of preventing tearing of the glass due to differences in expansion and contraction characteristics of the glass and plastic by applying between the facing surfaces of glass to plastic that lie outwardly of the boundaries of one of said glass sheets a parting material that will not adhere to either the glass or plastic to prevent such facing surfaces from bonding together before laminating the glass sheets and plastic layer together under heat and pressure.

17. The method of producing a stable extended plastic type of laminated safety glass unit which comprises assembling two sheets of glass with an interposed plastic interlayer of greater area than at least one of said glass sheets, applying a layer of separating material between all of the facing surfaces of glass to plastic that lie outwardly of the area of one of said glass sheets, and finally bonding the assembled glass sheets and plastic layer together under heat and pressure.

References Cited in the file of this patent

UNITED STATES PATENTS

| Number | Name | Date |
|---|---|---|
| 1,751,051 | Nobbe | Mar. 18, 1930 |
| 2,121,777 | Bailey et al. | June 28, 1938 |
| 2,270,323 | Land | Jan. 20, 1942 |
| 2,303,151 | Watkins | Nov. 24, 1942 |
| 2,567,353 | Ryan | Sept. 11, 1951 |
| 2,576,392 | Downes | Nov. 27, 1951 |